Patented July 26, 1949

2,476,952

UNITED STATES PATENT OFFICE 2,476,952

NONCRYSTALLIZING PRINTING COMPOSITIONS

Earl Edson Beard, Wilmington, Del., assignor to E. I. du Pont de Nemours & Company, Wilmington, Del., a corporation of Delaware No Drawing. Application August 22, 1947, Serial No. 770,199

7 Claims. (Cl. 106—22)

This invention relates to printing compositions containing phthalocyanine compounds as the coloring matter and an organic liquid or mixture of organic liquids as the vehicle. More particularly, this invention deals with lacquer type printing pastes for textile fabric or printing inks for paper which contain hydrocarbon solvents such as benzene, toluene, solvent naphtha or petroleum hydrocarbons, and which contain as coloring matter copper-phthalocyanine, or a mixture of copper-phthalocyanine with monochloro-copper-phthalocyanine.

It is an object of this invention to produce printing compositions of the above type which shall be free of the common defect of crystal growth. A further object is to produce such improved printing compositions without resort to stabilizers which affect the color value or shade of the principal color. Additional important objects of this invention will appear as the description proceeds.

Coloring matters of the phthalocyanine series, especially copper-phthalocyanine, have shades, tinctorial properties and light-fastness which would make them exceedingly valuable as pigments for printing inks, lacquer type printing compositions, etc. Yet, they have not found the widest commercial application in these fields to date, on account of a certain inherent tendency of pigments of the phthalocyanine family to segregate from the liquid vehicle. Practically all compounds of the phthalocyanine series have a strong tendency to flocculate. This term refers to the tendency of the pigment to settle out from the paint or lacquer and is particularly noxious, where a white pigment, such as zinc oxide, is employed to dilute the toner, since then the weakening effect of flocculation on the tinctorial value of the toner is particularly noticeable. Inasmuch as printing inks and lacquer type printing pastes employ as a rule the pure toner, i. e., without any white diluents, flocculation is not particularly objectionable for the printing uses just referred to.

Chlorine - free copper - phthalocyanine and chlorine-free, metal-free phthalocyanine, however, have an additional noxious tendency toward crystal growth. Crystal growth also diminishes the tinctorial value of the coating composition. But whereas a flocculated pigment can be brought back into a state of intimate dispersion by violent or turbulent agitation, as for instance by applying the lacquer through the nozzle of a spray gun, the defect introduced by crystal growth is practically irreversible. Crystal growth is especially manifest where the liquid-vehicle or thinner contains solvents of an aromatic nature, for instance toluene and the xylenes.

This application is concerned primarily with coloring compositions comprising aromatic solvents as the vehicle, and its object is to enable one to employ copper-phthalocyanine or mixtures thereof with monochloro-copper-phthalocyanine as the pigment, without running into the trouble of crystal growth. According to this invention the mentioned tendency to crystal growth is neatly and effectively overcome by admixing with the principal color a small quantity of a tin-phthalocyanine compound.

To explain the latter term, it will be recalled that tin has the capacity of entering into the phthalocyanine complex both as a divalent metal and as a tetravalent metal (Barrett et al., Jour. Chem. Soc., 1936, pp. 1722-3). When it enters as a divalent metal, the compound is stannous-phthalocyanine, corresponding in structure to copper-phthalocyanine or zinc-phthalocyanine (Dent et al., Jour. Chem. Soc., 1934, p. 1035). But when it enters as tetravalent metal, the residual two valencies of the tin may be satisfied by halogen atoms, producing, for instance, dichloro-tin-phthalocyanine. Other anionic atoms or radicals may also be made to satisfy the residual valencies of the tin in lieu of chlorine, for instance bromine, fluorine, hydroxy radicals, etc., depending on the mode of preparation of the compound or on the history of subsequent treatments. The tetravalent tin atom may also span two phthalocyanine complexes, according to the scheme Pc=Sn=Pc, the compound in this instance being known as stannic-phthalocyanine.

Now, I find that all these various forms of tin-phthalocyanine compounds, both stannous and stannic, are effective to overcome the aforenoted drawback in connection with printing compositions containing copper-phthalocyanine as the principal coloring material. This observation is exceedingly surprising, for there is no apparent theoretical reason for any special physical or chemical interaction between the two types of phthalocyanines, and certainly no ready explanation for the selectivity of the effect. Moreover, although dichloro-tin-phthalocyanine by itself is fugitive to light, fadeometer tests revealed no drop in tinctorial strength of the mixture, even when it contained as high as 10% by weight of the tin compound. Apparently then, the copper color in turn acts to stabilize the tin color against the action of light. Such a reciprocal cooperation and mutual protection certainly was not to be predicted on the basis of anything taught in the phthalocyanine literature.

To exert its maximum protective effect, it is naturally desirable to have the tin-phthalocyanine compound associated as intimately as possible with the particles of the copper-phthalocyanine. Such intimate association is readily obtained in the case of other auxiliary colors (incorporated for other purposes) by co-precipitation from a solvent. (See for instance Dahlen and Detrick, U. S. P. 2,192,704.) The tin-phthalocyanines, however, are not stable in sulfuric acid, the solvent that would normally be used for "acid-pasting"; coprecipitation is therefore not the best method to be applied for the purpose in question. Fortunately, I found that when the tin-phthalocyanine compound is reduced to a fine state of subdivision by the method of salt grinding (Lang and Detrick, U. S. P. 2,402,167), it may be then admixed with the finely divided principal phthalocyanine color (which in turn may have been prepared in fine state either by salt grinding or by "acid-pasting") by simply mixing the two together in any convenient manner. The two colors may be admixed in wet state or in dry form. Moreover, the two colors may be brought together for the first time by the consumer in the process of preparing the printing composition, by incorporating each in customary manner in the selected vehicle.

The necessary proportion of tin-phthalocyanine compound to be added differs somewhat, depending on the particular phthalocyanine mixture employed and on the results sought to obtain. For instance, monochloro-copper-phthalocyanine (Linstead and Dent, U. S. P. 2,129,013) is by itself sufficiently stable against crystal growth and needs no addition of the tin compound, if it is to be employed in full strength as in the case of a printing composition. In the case, however, of chlorine-free copper-phthalocyanine (as produced for instance from copper and phthalonitrile, U. S. P. 2,166,213, or by the urea process, U. S. P. 2,197,458) the tendency to crystal growth is very strong. I find it convenient, therefore, to calculate the proportion of tin-phthalocyanine on the basis of the weight of chlorine-free copper-phthalocyanine in the pigment composition. Thus, with a principal color consisting essentially of chlorine-free copper-phthalocyanine or of metal-free phthalocyanine, 1 to 5% of the auxiliary tin color based on the weight of the principal color will achieve substantially complete freedom from objectionable crystal growth. On the other hand, if commercial semi-chloro copper-phthalocyanine is employed (which is really a mixture of chlorine-free and monochloro-copper-phthalocyanine, U. S. P. 2,129,013), the use of 1 to 2.5% of the tin compound, based on the total weight of the copper color, gives satisfactory results. Quantities in excess of the above, even up to 12%, do no harm, and may be employed if desired.

Without limiting this invention, the following examples will illustrate my preferred mode of operation. Parts mentioned are by weight.

Example 1

500 parts of dry table salt, 96 parts of crude, water-extracted, and dried chlorine-free copper-phthalocyanine, and 4 parts of dichlorotin-phthalocyanine crystals (as obtained from stannous chloride and phthalonitrile) are milled together in a ball mill until full pigment strength is developed (as determined by sampling and submitting the extracted and dried pigment to ink drawn-down tests). The product is then discharged from the mill; the salt is extracted from the pigment by stirring with water which may contain 1% to 2% by weight of a mineral acid such as sulfuric acid; the suspension is filtered, and the filter cake is washed until essentially free of acid. The filter cake thus obtained is stirred with 1000 parts of water which contains 5 to 10 parts of ammonia, for a period of one hour at a temperature of 50°-60° C. The alkaline suspension is filtered and the filter cake is washed free of alkali. This filter cake is treated with a small amount of dispersing agent, and is then passed through a colloid mill. The pigment content of the phthalocyanine paste thus stabilized is adjusted to 20% by weight, either by evaporation or by addition of water as required. The stabilized copper-phthalocyanine pigment thus obtained may be incorporated into printing inks or into printing pastes for textile fabric in standard manner. See, for instance, Examples 5 and 7 hereinbelow.

Example 2

10 parts of dichlorotin-phthalocyanine and 60 parts of dry table salt are milled together in a steel ball mill for 40 hours. The pigment and salt mixture is then stirred in water as described in Example 1, and the pigment is filtered and washed. Three parts (pigment basis) of the milled dichlorotin-phthalocyanine, as thus obtained in the form of filter cake, is thoroughly mixed with a filter cake containing 97 parts of a pigment mixture which consists of approximately equal parts of copper-phthalocyanine and monochloro-copper-phthalocyanine, and which has previously been reduced to pigmentary form by acid-pasting (i. e. dissolving in sulfuric acid, then drowning in water, filtering, and washing the filter cake free of acid). The stabilized pigment thus obtained may be incorporated into a printing paste for textile fabric as in Example 5 hereinbelow.

Example 3

2 parts (pigment basis) of dihydroxytin-phthalocyanine prepared in the form of a filter cake (obtained by boiling a salt-milled mixture of dichlorotin-phthalocyanine and table salt in dilute ammonia suspenion for 1 hour, filtering, and washing the product free of alkali) and 98 parts (pigment basis) of copper-phthalocyanine (previously reduced to pigmentary form by means of salt milling, extracting the salt with water or dilute mineral acid, filtering, and washing) are thoroughly mixed in a homogenizer. The resulting mixture is dispersed, milled and adjusted to 20% color solids as described in Example 1, and is suitable for use in printing pastes as in Example 5 hereinbelow.

Example 4

Other stabilized pigment powders may be obtained by mixing soft powders (pigmentary form and free of objectionable "texture" or grit) of any of the tin-phthalocyanine compounds named in this application, in the ratio of 2% to 5% by weight with soft powders of copper-phthalocyanine. Twenty parts by weight of the stabilized phthalocyanine powders thus obtained are incorporated, together with 80 parts of water, into the textile printing paste formula described in Example 5 hereinbelow by means of ball milling or high-speed mixing.

Example 5

A printing paste is prepared as follows:

105.0 parts of solvent naphtha (aromatic) at 50° C., 3.5 parts of ethyl cellulose, 50.0 parts of solvent-soluble urea-formaldehyde resin solution (55% resin, 25% xylene, 20% iso-butanol), and 105.5 parts of glyptal resin solution (60% resin, 40% xylene) are stirred together, then treated alternately, under agitation, with 40.0 parts of pine oil and 496.0 parts of common salt solution (95.2% water, 4.8% NaCl). The emulsion so obtained is treated with 100.0 parts of the aqueous color paste obtained in any of the examples hereinabove (20% stabilized phthalocyanine pigment), and agitated at high speed for one minute. In order to adjust the viscosity of the printing paste, alternate additions of solvent naptha (aromatic-or xylenes) and water are incorporated, amounting, on the average to 50.0 parts of xylenes and 50.0 parts of water.

The printing paste is usually applied to textile fabrics by means of roller printing machines. The printed fabric is heated for a few minutes at 125°–150° C. in order to effect drying and to polymerize the resin binders.

The prints obtained by use of the stabilized phthalocyanines show improved pigment strength as compared with similar prints in which the unstabilized or crystal-growing types of phthalocyanine pigments are employed. This result is accounted for by the fact that the improved printing pastes of this invention are characterized by stability against objectionable crystal growth of the phthalocyanine coloring matter, even after being allowed to stand for an extended period of time. By objectionable crystal growth I refer to large crystals which may be observed under a good optical microscope, and which cause a loss of color strength in the finished textile print. Chlorine-free copper phthalocyanine, and many mixtures now on the market which contain this compound, exhibit such crystal growth after incorporation (in pigmentary but unstabilized form) into the above described textile printing paste.

A further advantage exhibited by the phthalocyanines which are stabilized against crystal growth, as compared with the unstabilized and crystal growing phthalocyanines, is the improved resistance of the stabilized pigment against "crocking" off the finished textile print. This last mentioned improvement has been wanting in this field for a long time.

It will be clear that this invention is not limited to the detailed reagents, proportions and procedure set forth in the above Example 5. Instead, the stabilized pigments of Examples 1 to 4 inclusive may be incorporated in any coating composition which includes an organic solvent as vehicle or as part of a mixed vehicle and which is otherwise subject to the objectionable tendency toward crystal growth. The principal phthalocyanine color may include metal-free phthalocyanine, copper-phthalocyanine, or a mixture of copper-phthalocyanine with other phthalocyanine colors, especially monochloro-copper-phthalocyanine. These features are further illustrated by the following additional examples.

Example 6.—Stabilized metal-free phthalocyanine pigments (a) An aqueous filter cake containing approximately 30% by weight of a pigmentary form of metal-free phthalocyanine is obtained by acid-pasting the crude form of the pigment, as described in Example 2 above, followed by a hot alkaline extraction, filtering and washing the cake until it is essentially free of alkali. Ninety-five parts (pigment basis) of the filter cake thus obtained and 5 parts (pigment basis) of dihydroxytin-phthalocyanine (employed in the form of a filter cake and obtained as described in Example 3) are treated with a small amount of dispersing agent and thoroughly milled together by means of a colloid mill.

20 parts (pigment basis) of the metal free phthalocyanine dispersed paste thus stabilized is incorporated into the printing paste formula of Example 5 and applied to textile fabrics as more fully described in that example.

(b) The procedure is the same as in part (a) above, except that only 1.3 parts of the dihydroxytin-phthalocyanine compound are employed and the quantity of metal-free phthalocyanine is raised to 98.7 parts (both on pigment basis). The resulting product shows excellent qualities when incorporated into a printing paste as in Example 5 hereinabove.

Example 7.—Rotogravure printing ink (a) Mix 95 parts, by weight, of a salt-milled soft powder of chlorine-free copper-phthalocyanine with 5 parts of the soft powder of dichlorotin-phthalocyanine which is obtained by drying the filter cake of the milled dichlorotin-phthalocyanine described above in Example 2.

(b) Mix 95 parts by weight, of a salt-milled soft powder of chlorine-free copper-phthalocyanine with 5 parts of the soft powder of dihydroxytin-phthalocyanine which is obtained by drying the filter cake of the milled dihydroxytin-phthalocyanine described in Example 3.

The above stabilized pigment powder mixtures may be individually incorporated in the following rotogravure ink formulation:

| (c) | Parts |
|---|---|
| Limed rosin (6% lime) | 55.0 |
| Mixed xylenes (boiling range 3° C.) | 45.0 |
| Pigment from paragraph (a) or (b) above and | 11.0 |
| Colloidal clay (any convenient commercial grade) | 4.0 |
| Total parts of ink | 115.0 |

This rotogravure ink mixture is ball-milled for 4 days and observed for growth of crystals of the pigment by means of a light microscope.

The resulting rotogravure ink develops full strength in the ordinary ink draw-down test, and one observes no crystal growth of the finely divided pigment under the light microscope even after storage for a long period of time. Furthermore, the viscosity of the ink is satisfactory for use in rotogravure printing.

On the other hand, when the original (unstabilized) soft powder of chlorine-free copper-phthalocyanine is treated in the same rotogravure ink formulation in the same manner, and tested in the same way, an ink is obtained which exhibits the following defects:

1. The pigment is almost entirely in the form of large crystals.
2. A serious loss in tinctorial strength is observed in the ink draw-down test (as compared against the draw-down made from the above stabilized sample).
3. The ink is not sufficiently viscous to be of interest in the trade.

In all the above examples the specified tin-phthalocyanine compound may be replaced, with beneficial results, by an equal weight of any of the following tin-phthalocyanine compounds, namely:

Dichlorotin-phthalocyanine (Cl$_2$=Sn=Pc),
Difluorotin-phthalocyanine,
Dibromotin-phthalocyanine,
Dihydroxytin-phthalocyanine, Chlorohydroxytin-phthalocyanine $\begin{pmatrix} Cl \\ \diagdown \\ HO \end{pmatrix} Sn=Pc$, Stannous-phthalocyanine (Sn=Pc),
Stannic-phthalocyanine (Pc=Sn=Pc), and in fact any of the phthalocyanine compounds containing tin as the central metal and indicated in the Barrett et al. article referred to.

In the claims below, the expression "a tin-phthalocyanine compound" shall be understood as a generic expression for the various phthalocyanine derivatives above mentioned which contain tin as the central metal, including stannous-phthalocyanine, stannic-phthalocyanine, the di-halogen tin - phthalocyanines, dihydroxytin-phthalocyanine, and all the other variations indicated in said article by Barrett et al., (J. C. S., 1936, pp. 1722–3).

I claim as my invention:

1. A printing composition comprising a coloring matter and a liquid vehicle, said coloring matter consisting at least in part of a phthalocyanine compound selected from the group consisting of copper-phthalocyanine and metal-free phthalocyanine and said liquid vehicle consisting at least in part of a liquid aromatic hydrocarbon which has a tendency to encourage crystal growth in coloring matters of the aforementioned group, said printing composition being distinguished by comprising further a tin-phthalocyanine compound in quantity not less than 1% and not more than 12% based on the weight of said first-mentioned phthalocyanine compound, whereby said composition is stabilized against separation of the color through crystal growth.

2. A printing composition comprising a coloring matter and a liquid vehicle, said coloring matter consisting at least in part of copper phthalocyanine, and said liquid vehicle consisting at least in part of a liquid aromatic hydrocarbon which has a tendency to encourage crystal growth in copper phthalocyanine, said printing composition comprising further a tin-phthalocyanine compound in quantity not less than 1% and not more than 12% based on the weight of said copper-phthalocyanine, said composition being characterized by stability against separation of the color through crystal growth.

3. A printing composition comprising a coloring matter and a liquid vehicle, said coloring consisting essentially of copper phthalocyanine, and said liquid vehicle consisting at least in part of a liquid aromatic hydrocarbon which has a tendency to encourage crystal growth in copper phthalocyanine, said printing composition being characterized by comprising further a tin-phthalocyanine compound, both of said phthalocyanine compounds being in a finely divided form and being intimately dispersed in the vehicle, the quantity of the tin compound being from 2 to 5% by weight of the said copper-phthalocyanine, whereby said coloring composition is stabilized against separation of the color through crystal growth.

4. A printing composition consisting essentially of copper - phthalocyanine and dichlorotin-phthalocyanine suspended in a liquid vehicle consisting at least in part of an aromatic liquid hydrocarbon, the quantity of dichlorotin-phthalocyanine being between 2 and 5% based on the weight of the copper-phthalocyanine, and the entire composition being characterized by stability against separation of the color through crystal growth.

5. A printing composition consisting essentially of copper-phthalocyanine, monochloro-copper-phthalocyanine and dichlorotin-phthalocyanine suspended in a liquid vehicle consisting at least in part of an aromatic liquid hydrocarbon, the quantity of dichlorotin-phthalocyanine being between 2 and 5% based on the weight of the chlorine-free copper-phthalocyanine, and the entire composition being characterized by stability against separation of the color through crystal growth.

6. A printing composition consisting essentially of copper-phthalocyanine and dihydroxytin-phthalocyanine suspended in a liquid vehicle consisting at least in part of an aromatic liquid hydrocarbon, the quantity of dihydroxytin-phthalocyanine being between 2 and 5% based on the weight of the copper-phthalocyanine, and the entire composition being characterized by stability against separation of the color through crystal growth.

7. A printing composition consisting essentially of copper-phthalocyanine and monochloromono-hydroxytin-phthalocyanine suspended in a liquid vehicle consisting at least in part of an aromatic liquid hydrocarbon, the quantity of monochloro-monohydroxytin-phthalocyanine being between 2 and 5% based on the weight of the copper-phthalocyanine, and the entire composition being characterized by stability against separation of the color through crystal growth.

EARL EDSON BEARD.

REFERENCES CITED

The following references are of record in the file of this patent:

UNITED STATES PATENTS

| Number | Name | Date |
|---|---|---|
| 2,222,582 | Benett | Nov. 19, 1940 |
| 2,238,243 | Black | Apr. 15, 1941 |
| 2,285,183 | Bernardi | June 2, 1942 |